United States Patent
Akopian et al.

(10) Patent No.: US 10,819,663 B2
(45) Date of Patent: Oct. 27, 2020

(54) INTERACTIVE MOBILE SERVICE FOR DEPLOYING AUTOMATED PROTOCOLS

(71) Applicants: David Akopian, San Antonio, TX (US); Rodrigo David Escobar Palacios, San Antonio, TX (US); Sahak Igor Kaghyan, San Antonio, TX (US)

(72) Inventors: David Akopian, San Antonio, TX (US); Rodrigo David Escobar Palacios, San Antonio, TX (US); Sahak Igor Kaghyan, San Antonio, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 382 days.

(21) Appl. No.: 15/680,486

(22) Filed: Aug. 18, 2017

(65) Prior Publication Data

US 2018/0054400 A1    Feb. 22, 2018

Related U.S. Application Data

(60) Provisional application No. 62/376,445, filed on Aug. 18, 2016.

(51) Int. Cl.
*H04L 29/08* (2006.01)
*H04L 12/58* (2006.01)
(Continued)

(52) U.S. Cl.
CPC .......... *H04L 51/02* (2013.01); *G06Q 30/016* (2013.01); *H04L 12/1432* (2013.01); *H04L 41/5038* (2013.01); *H04L 43/10* (2013.01); *H04L 43/18* (2013.01); *H04L 51/38* (2013.01); *H04L 67/02* (2013.01); *H04L 67/306* (2013.01); *H04M 15/58* (2013.01); *H04M 15/61* (2013.01); *H04W 4/14* (2013.01)

(58) Field of Classification Search
None
See application file for complete search history.

(56) References Cited

U.S. PATENT DOCUMENTS

| | | | |
|---|---|---|---|
| 2011/0092187 A1* | 4/2011 | Miller | H04L 12/1818 455/412.1 |
| 2015/0074546 A1* | 3/2015 | Slawson | G06F 3/0484 715/747 |

(Continued)

OTHER PUBLICATIONS

"Avaya Aura Orchestration Designer Developer's Guide", Avaya.com, Dec. 2013 [retrieved on Sep. 10, 2019]. Retrieved from the Internet: <URL: https://downloads.avaya.conn/css/P8/documents/100177415>. (Year: 2013).*

(Continued)

*Primary Examiner* — Kevin T Bates
*Assistant Examiner* — Dae Kim
(74) *Attorney, Agent, or Firm* — Thomas Horstemeyer, LLP

(57) ABSTRACT

Disclosed are various embodiments that relates to executing a sequence of messaging nodes, where the messaging sequence is defined by user-defined local triggering conditional expressions for each messaging node, and supporting proper data organization and links that integrate individual message instances in a protocol flow.

20 Claims, 8 Drawing Sheets

(51) Int. Cl.
| | |
|---|---|
| H04L 12/24 | (2006.01) |
| H04L 12/14 | (2006.01) |
| H04W 4/14 | (2009.01) |
| G06Q 30/00 | (2012.01) |
| H04L 12/26 | (2006.01) |
| H04M 15/00 | (2006.01) |

(56) References Cited

U.S. PATENT DOCUMENTS

| | | | | |
|---|---|---|---|---|
| 2015/0269850 | A1* | 9/2015 | Rivera de la Vega | G09B 5/02 |
| | | | | 434/238 |
| 2017/0187794 | A1* | 6/2017 | Cherepanov | H04L 43/0876 |
| 2017/0195488 | A1* | 7/2017 | Pendyala | H04M 3/5183 |
| 2018/0331979 | A1* | 11/2018 | Rakovitsky | H04L 51/046 |

OTHER PUBLICATIONS

Siedner et al. "Know your audience: Predictors of Success for a Patient-Centered Texting App to Augment Linkage to HIV Care in Rural Uganda", Journal of Medical Internet Research, vol. 17 issue 3, 2015 [retrieved on Sep. 10, 2019]. Retrieved from the Internet: <URL: https://www.jmir.org/2015/3/e78/pdf>. (Year: 2015).*
Stockler-Ipsiroglu et al., "(GAMT) deficiency: Outcomes . . . ", Molecular Genetics and Metabolism, vol. 111, 2014 [retrieved on Sep. 10, 2019]. Retrieved from the Internet: <URL: https://www.sciencedirect.com/science/article/pii/S1096719213003661>. (Year: 2014).*
"Best Practices for Regression Testing Your IVR", Cyara.com, Sep. 2015 [retrieved on Sep. 10, 2019]. Retrieved from the Internet: <URL: https://cyara.com/wp-content/uploads/2015/11/Best-Practices-Regression-Testing-Your-IVR_WP_r5.pdf>. (Year: 2015).*
Dayer L, Heldenbrand S, Anderson P, Gubbins PO, & Martin BC. Smartphone medication adherence apps: potential benefits to patients and providers. J Am Pharm Assoc (2003). Mar.-Apr. 2013;53(2):172-181.
Agboola S, Kamdar M, Flanagan C, Sean M, Traeger L, Kvedar J, Jethwani K. Pain management in cancer patients using a mobile app: study design of a randomized controlled trial. JMIR Res Protoc. Dec. 12, 2014;3(4):e76.
Heron KE, Smyth JM. Ecological momentary interventions: incorporating mobile technology into psychosocial and health behaviour treatments. Br J Health Psych.Feb. 2010;15(Pt1):1-39.
Arsand E, Tatara N, Østengen G, Hartvigsen G. Mobile phone-based self-management tools for type 2 diabetes: the few touch application. J Diab. Sci Technol. Mar. 1, 2010;4(2):328-36.
Ly KH, Topooco N, Cederlund H, Wallin A, Bergström J, Molander O, Carlbring P, Andersson G. Smartphone-Supported versus Full Behavioural Activation for Depression: A Randomised Controlled Trial. PLoS One. May 26, 2015;10(5):e0126559.
Glynn LG, Hayes PS, Casey M, Glynn F, Alvarez-Iglesias A, Newell J, OLaighin G, Heaney D, O'Donnell M, Murphy AW. Effectiveness of a smartphone application to promote physical activity in primary care: the SMART MOVE randomised controlled trial. Br J Gen Pract. Jul. 2014;64(624):e384-91.
Free, C., Knight, R., Robertson, S., Whittaker, R., Edwards, P., Zhou, W., Rodgers, A., Cairns, J., Kenward, M.G., & Roberts, I. (2011). Smoking cessation support delivered via mobile phone text messaging (txt2stop): a single-blind, randomized trial. Lancet 378, 49-55.
Whittaker, R., McRobbie, H., Bullen, C., Borland, R., Rodgers, A., & Gu, Y. (2012). Mobile phone-based interventions for smoking cessation. Cochrane Database of Systematic Reviews Issue 11. Art. No. CD006611.
Abroms, L.C., Boal, A.L., Simmens, S.J., Mendel, J.A., & Windsor R.A. (2014). A randomized trial of Text2Quit: a text messaging program for smoking cessation. Am J Prev Med, 47(3), 242-250.
Istepanian, R.S.H., Laxminarayn, S., Pattichis, C.S. (2006) M-Health: Emerging Mobile Health Systems. Topics in Biomedical Engineering. Int. Book Series. London, UK: Springer-Verlag.
Escobar, R.D., Akopian, D., Parra-Medina, D., Esparza, L. (2013) "MessageSpace: a messaging system for health research", Proc. SPIE 8667, Multimedia Content and Mobile Devices, (Mar. 2013).
Ward, B. W., Dahlhamer, J. M., Galinsky, A. M., & Joestl, S. S. (2014). Sexual orientation and health among US adults: National Health Interview Survey, 2013. National Health Statistics Reports, 77, 1-12.
Pew Research Center. www.pewinternet.org. Reports: "Technology Device Ownership:2015"; "Mobile Messaging and Social Media: 2015".
Burstein HJ, Prestrud AA, Seidenfeld J, Anderson H, Buchholz TA, Davidson NE, et al. American Society of Clinical Oncology clinical practice guideline: update on adjuvant endocrine therapy for women with hormone receptor—positive breast cancer. J Clin Oncol. 2014;28:3784-96.
U.S. Department of Health and Human Services. Using Health Text Messages to Improve Consumer Health Knowledge, Behaviors, and Outcomes. An Environmental Scan. May 2014.
Cole-Lewis, H., and T. Kershaw. "Text Messaging as a Tool for Behavior Change in Disease Prevention and Management." Epidem. Reviews,vol. 32, No. 1, 2010, pp. 56-69.
Car, J., I. Gurol-Urganci, T. de Jongh, V. Vodopivec-Jamsek, and R. Atun. "Mobile Phone Messaging Reminders for Attendance at Healthcare Appointments." Cochrane Database of Systematic Reviews, No. 7, 2012.
Fjeldsoe, B., A. Marshall, and Y. Miller. "Behavior Change Interventions Delivered via Mobile Telephone Short-Message Service." American Journal of Preventive Medicine, vol. 36, No. 2, 2009, pp. 165-173.
Guy, Rebecca, Jane Hocking, Handan Wand, Sam Stott, Hammad Ali, and John Kaldor. "How Effective Are Short Message Service Reminders at Increasing Clinic Attendance? A Meta-Analysis and Systematic Review." Health Services Research, vol. 47, No. 2, Apr. 2012, pp. 614-632.

* cited by examiner

INTERACTIVE MOBILE SERVICE FOR DEPLOYING AUTOMATED PROTOCOLS

CROSS-REFERENCE TO RELATED APPLICATIONS

This application claims priority to co-pending U.S. Provisional application titled, "Interactive Mobile Service for Deploying Automated Protocols," having Ser. No. 62/376,445, filed Aug. 18, 2016, which is entirely incorporated herein by reference.

BACKGROUND

Mobile technology ownership has increased substantially over the past decade and has changed the landscape of many fields. In many industries, for example, the application of mobile technology has helped with improving the convenience, speed, and accuracy of various services.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

Figure 1A:
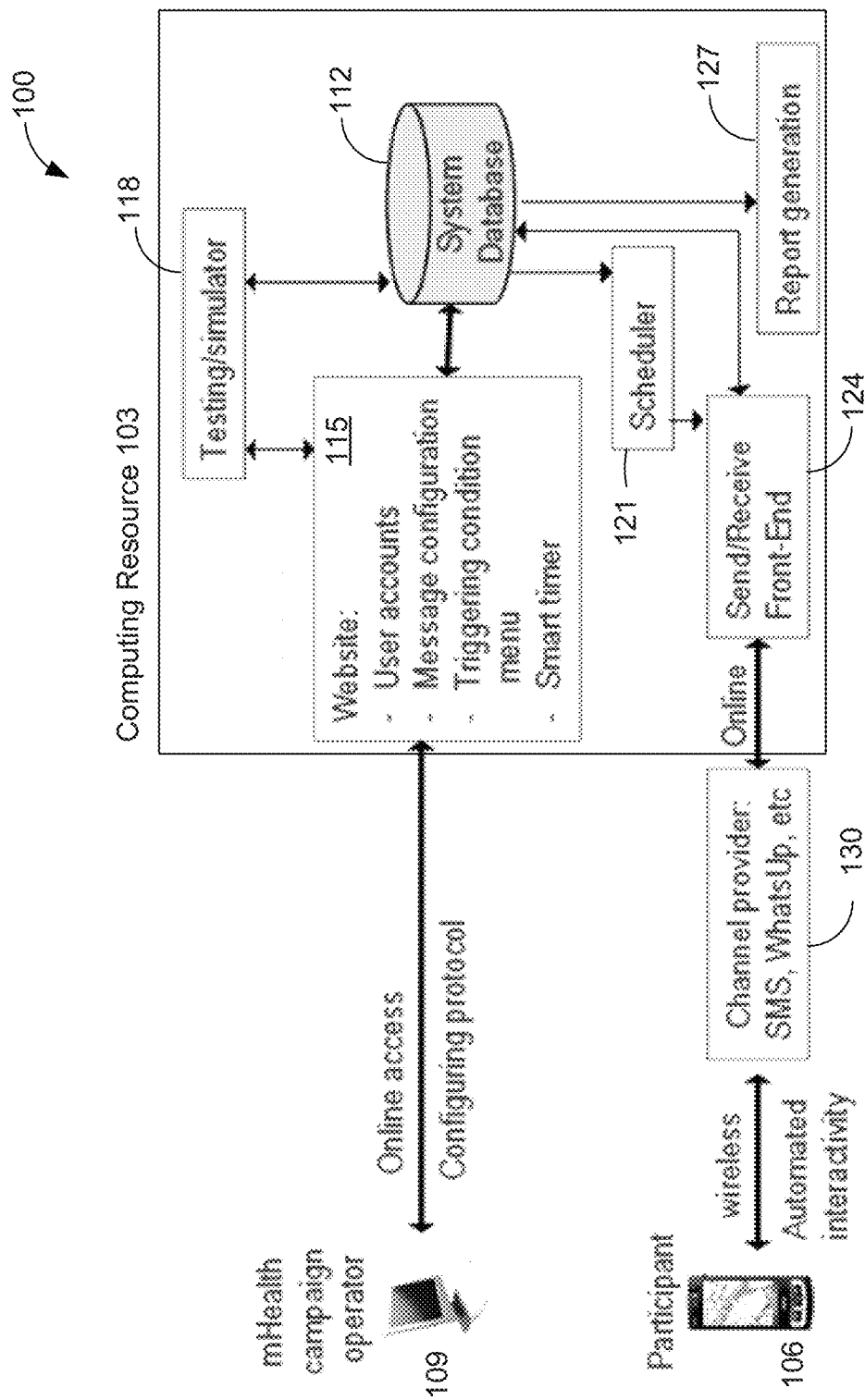
FIG. 1A is a drawing of a networked environment according to various embodiments of the present disclosure.

The drawings illustrate only exemplary embodiments and are therefore not to be considered limiting of the scope of the embodiments described herein, as other equally effective embodiments are within the scope and spirit of this disclosure. The elements and features shown in the drawings are not necessarily drawn to scale, emphasis instead being placed upon clearly illustrating the principles of the exemplary embodiments. Additionally, certain dimensions or positionings may be exaggerated to help visually convey certain principles. In the drawings, similar references numerals between figures designates like or corresponding, but not necessarily identical, elements.

DETAIL DESCRIPTION

Disclosed herein are various embodiments related to systems and methods for generating interactive automated mobile messaging services for communicating with individuals with mobile devices. Machine-human communication can typically be programmed as a protocol, which describes a sequence of messaging instances which may branch depending on the feedback from the recipient (participant) and other variables which are defined by campaign organizers (users). Typically, this communication is implemented as a state machine, which reflects the protocol flow and shows protocol flow branching nodes and conditional expressions at those nodes. The protocol can be designed as a tree, where the branches indicate possible alternative flows of the protocol sequence.

The problem with these protocols is that it is quite challenging to technically implement such trees for non-technical organizers. Long-term protocols with multiple branches is quite hard to replicate without mistakes even with sophisticated user-interfaces that may facilitate such designs. Also, modifications of such trees are very challenging as well because, often times, a tree cannot be modified by merely removing a tree node without adding discontinuities to the protocol flow.

Various embodiments to the present disclosure are unique in comparison with the state-of-the-art in executing a sequence of messaging nodes. The messaging sequence can be based on user-defined local triggering conditional expressions for each node, supporting proper data organization, and defined links that integrate individual message instances in an envisioned protocol flow. Particularly, the various embodiments of the present disclosure can comprise (a) a set of attributes/variables that are specified for all participants, (b) message node structures that describe a message and a logistics that integrate the message with the rest of the system, and (c) a timer and time attributes for each user.

As one non-limiting example, the embodiments of the present disclosure can be used for automated individualized health communication. The U.S. Department of Health and Human Services' Healthy People 2020 initiative defines health communication as an important area of health informatics, and "the research-based crafting and delivery of messages and strategies to promote the health of individuals and communities." Communication tools for health promotions, when effectively used, can inform, educate, motivate, and empower individuals and broader communities. The various embodiments of the present disclosure can be used in other applications such as interactive marketing campaigns, automatic multistage appointments, automated messaging based customer service, and banking and insurance interactions with customers.

Continuing with the health promotions example, semi-automatic messaging systems can be developed to assist campaign organizers in interacting with individual participants according to their needs as a way of coping with the massive volume of communication needed to reach a large population. Typically, health data is collected using feedback polls, which are then automatically processed to update user profiles. A system, such as MessageSpace, has been developed in collaboration with University of Texas Health Science Center at San Antonio (UTHSCSA) and is tailored for health promotional needs. The system successfully supported three health promotion projects at UTHSCSA for several years. An attractive feature of the system is in providing a convenient user interface for health promotion campaign organizers to deploy group-tailored protocols without long-term technical development. The weakness of these systems lies in their inability to handle personalized messaging protocols that automatically interact with participants according to a predesigned multistage cycling procedure that can be conditioned on participant responses and other campaign variables. Automation can help to handle a large volume of data that is complex and includes a large number of participants. As a result, automation can significantly increase the impact of messaging campaigns such as health promotions. Personalized multistage automatic cycling messaging systems do exist. However, such systems are programmed for specific protocols and cannot be reused for other communications promotion programs.

There exists a need for a flexible interactive automated messaging service that can deploy a variety of automated communications messaging protocols faster than existing solutions. For the purpose of this disclosure, automation can mean multistage personalized interaction between one of the embodiments of the present disclosure and participants according to predefined protocols. Easy-to-program services will motivate broader usage of interactive messaging technology for various communications promotion initiatives and will have a broader impact due to automation and massive participant support.

As 97% of cell-phone users use texting and 91% read mobile messages within 15 minutes upon their reception, it is not surprising that the efficacy of messaging-based health promotion campaigns has been confirmed by several studies. Nevertheless, most of the existing studies were typically limited in the number of participants due to protocol programming constraints and proper automation. Long term development and deployment of dedicated automated protocols is another critical barrier of large scale promotion campaigns, such as health promotion campaigns.

Embodiments of the present disclosure provide a framework for facilitating deployment and managing and testing of automated messaging projects with a user-friendly non-technical programming interface. In one embodiment, among others, the framework allows for users, such as health promotion researchers, to have better system control, implement modifications on the fly, reduce program costs, and optimize program implementation time. This can be accomplished while enhancing participants' engagement, retention, and satisfaction. Further, the various embodiments of the present disclosure have programmatic interfaces to popular data collection/capture systems such as REDCap®.

With reference to FIG. 1A, shown is a non-limiting example of a networked environment 100 that includes a computing resource 103, a participant client device 106 (also referred herein as a "participant"), and an operator client device 109 (also referred herein as a "user"), all of which are in data communication over a network. The network includes, for example, the Internet, intranets, extranets, wide area networks (WANs), local area networks (LANs), wired networks, wireless networks, or other suitable networks, etc., or any combination of two or more such networks.

Embodiments of the present disclosure can allow non-technical campaign organizers to "program" multistage automated messaging protocols via a network page. The computing resource 103 may comprise, for example, a server computer or any other computing device or system providing computing capability. The computing resource 103 may represent multiple computer systems arranged, for example, in one or more server banks or other arrangements. To this end, the computing resource 103 may comprise, for example, a cloud computing resource, a grid computing resource, and/or any other distributed computing arrangement. Such computer systems may be located in a single installation or may be dispersed among many different geographical locations. For purposes of convenience, the computing resource 103 is referred to herein in the singular. However, in one embodiment, the computing resource 103 represents a plurality of computer systems arranged as described above.

Various applications and/or other functionality may be executed in the computing resource 103 according to various embodiments. Also, various data is stored in a system database 112 that is accessible to the computing resource 103. The system database 112 may be representative of a plurality of data stores as can be appreciated. The data stored in the system database 112, for example, is associated with the operation of the various applications and/or functional entities described below.

Applications executed on the computing resource 103 may include, for example, a website application 115, a testing/simulator application 118, a scheduler application 121, a send/receive front-end application 124, a report generation application 127, and other applications, services, processes, systems, engines, or functionality not discussed in detail herein.

The website application 115 can be configured to generate and render websites on multiple devices over the network. In some embodiments, the website application 115 can render various websites for configuring user accounts, message configurations, user-friendly triggering conditions menus, and smart timers. The testing/simulator application 118 can be configured to test/simulate multistage protocols that can cycle for months. The scheduler application 121 can trigger messages when all triggering conditions are met, including timing conditions. The send/receive front-end application 124 can transmit and receive messages on the network. The send/receive front-end application 124 can transmit the messages via a channel provider 130 (e.g. SMS, WhatsUp, etc.). The report generation application 127 can generate reports associated with the automated messaging service being conducted.

Figure 4:
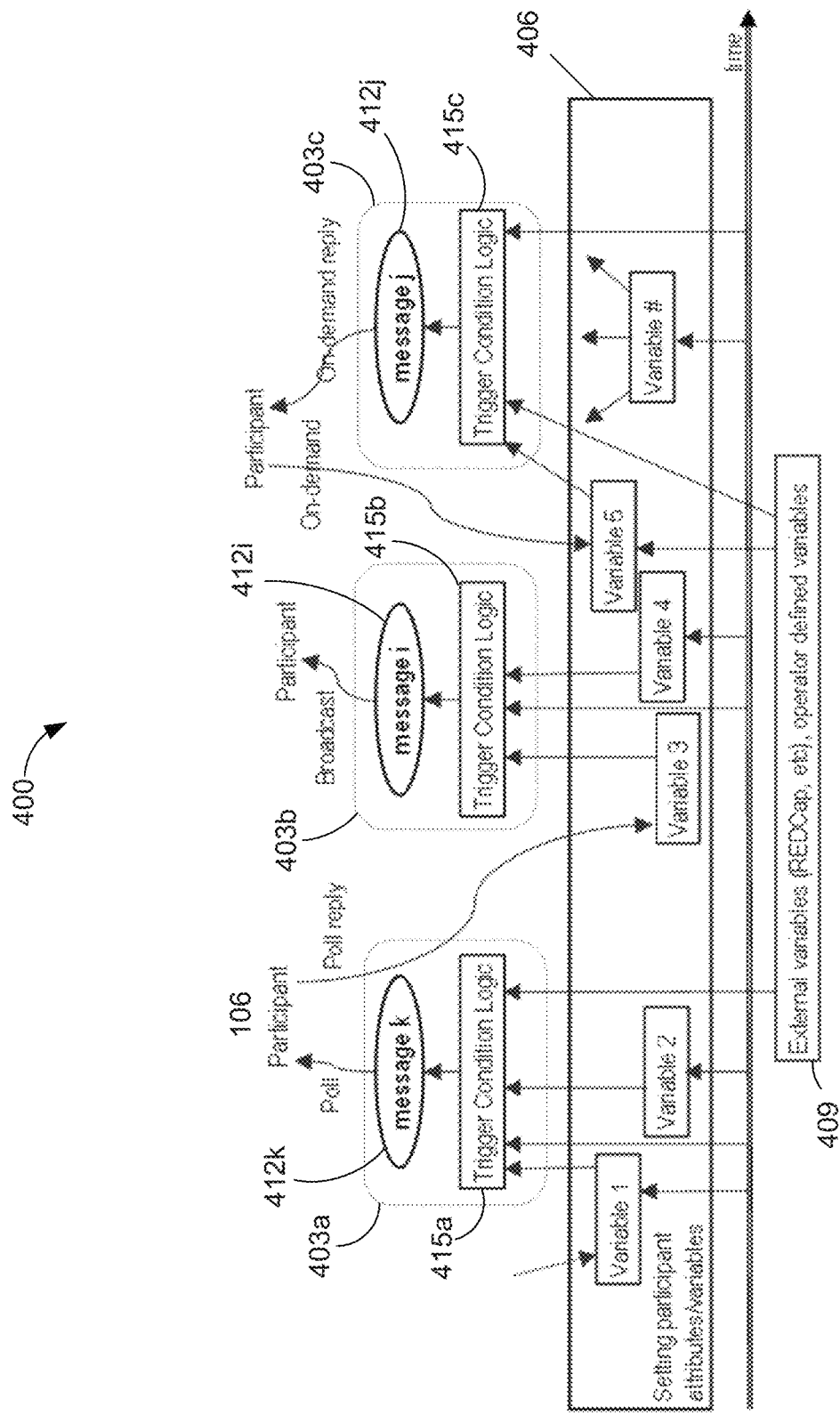
FIG. 4 illustrates an example of a user-defined flowchart of an automatic messaging protocol according to various embodiments of the present disclosure.

The system database 112 can comprise data associated with autonomous message nodes, user accounts, and data collected from a networked data capture application, such as REDCap (FIG. 4). Each autonomous message node can include a text message and triggering conditions. The triggering conditions can also include timing conditions and sequence conditions for determining a sequence for transmitting text messages triggered within a predefined time period.

Each user account can be associated with a respective participant client device 106, and each user account can comprise user attribute data associated with a user of the respective participant client device 106. For example, in one embodiment, the user attribute data may include the user's name, address, age, height, weight, physical measurements, medical history, medication history, and other personal health data. In another embodiment, the user attribute data can be derived from text message replies to text message questions transmitted to the participant client device 106. Data collected from the networked data capture application can include information collected from surveys, demographics data, research studies data, and other suitable data sources.

The participant client device 106 and the operator client device 109 are representative of a plurality of client devices that may be coupled to the network. The participant client device 106 and the operator client device may comprise, for example, a processor-based system, such as a computer system. Such a computer system may be embodied in the form of a desktop computer, a laptop computer, a personal digital assistant, a cellular telephone, set-top box, music players, web pads, tablet computer systems, a gaming console, a smartphone, a wearable-computing device, or other devices with like capability.

The participant client device 106 and the operator client device 109 may be configured to execute various applications such as a browser and/or other applications. The browser may be executed in the participant client device 106 and the operator client device, for example, to access and render network pages, such as web pages, or other network content served up by the computing resource 103 and/or other servers. The participant client device 106 and the operator client device 109 may be configured to execute applications beyond browser applications such as, for example, email applications, instant message applications, and/or other applications.

When executed in the participant client device 106 or the operator client device 109 (also referred herein as a "user"), the browser renders network pages on a respective display device and may perform other functions. The browser accesses network pages such as web pages or other types of content from the computing resource 103 in order to access the functionality of the various applications described herein and other components implemented in the computing resource 103 as will be described.

Figure 1B:
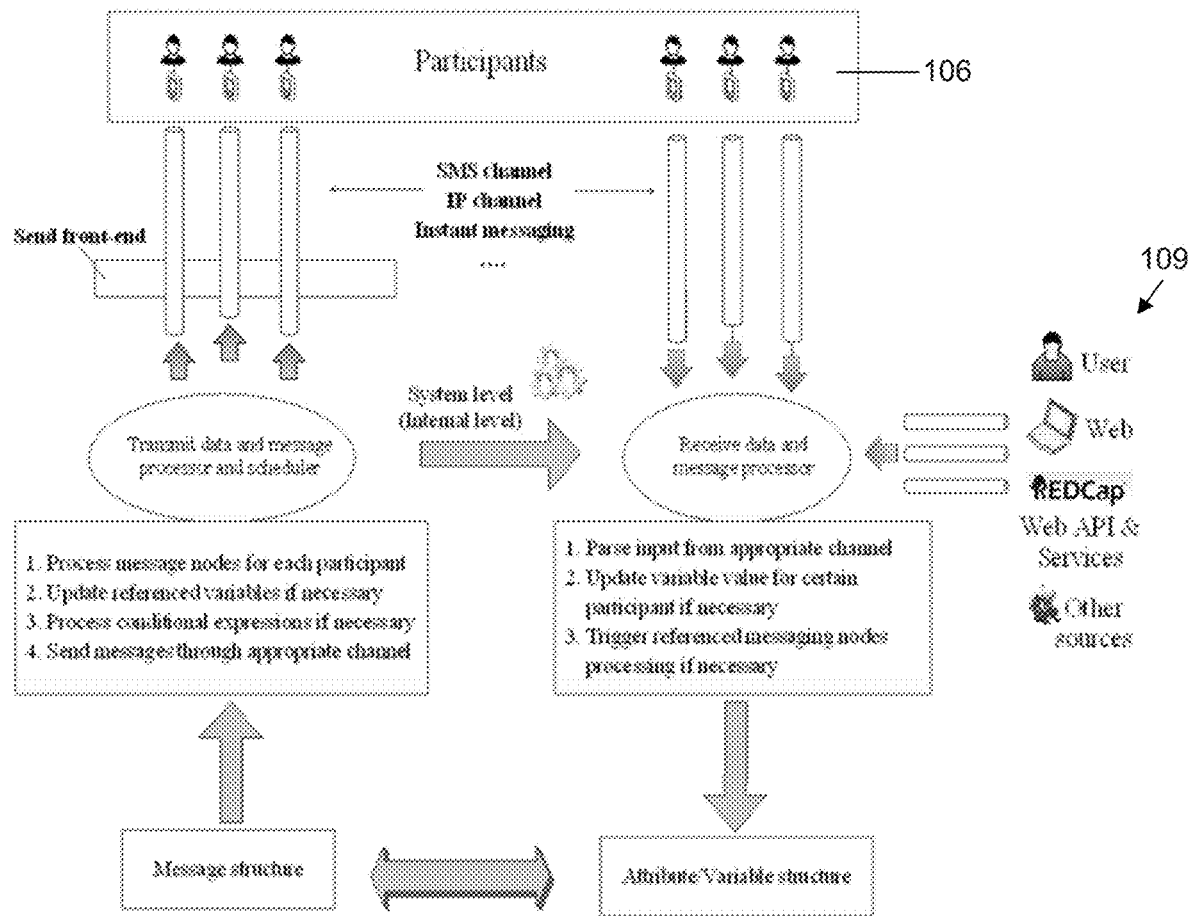
FIG. 1B is a drawing of a protocol flow according to various embodiments of the present disclosure.

With reference to FIG. 1B, shown is a drawing of a protocol flow. The system database 112 can maintain a list of attributes for each participant client device 106, which to some extent characterize the participant with the mobile device. The user, such as a campaign operator 109, can configure the system by providing initial attributes to each mobile device associated with individual participant client devices 106. For example, each participant client device 106 with a mobile device can be assigned age, gender and other similar attributes (=variables) of the mobile device owner. This data might be collected using a registration process, i.e. mobile device owner enters data using a dedicated user interface, in person, webpage, email, through messaging communication or other existing approaches. The user (protocol designer) can be involved in this data collection, for example, by using a phone-based data collection, which enters data from the mobile device owner provided with paper answers. The system can also have other types of attributes that are collected dynamically as the protocol cycles. These attributes can include poll responses, time stamps which are initialized dynamically based on cycling instances such as poll reply times, and other types of responses. Similar dynamically initialized attributes may also be entered by the user when the protocol cycles. These attributes can be defined beforehand, but can be initialized dynamically. In other words, the values assigned to attributes can be dynamically updated during the cycling of the protocol. For example an attribute "availability" may be Saturday in the beginning of a protocol instance, and then change to "Sunday" later by the user during protocol cycling. In other words, the values assigned to attribute variables can change over time by any source having control of the systems (user, authorized external source, etc). For instance, the attribute values can be defined by messages from mobile devices. For example, attribute variable Poll151_response can be initially set to Poll151_response=not_defined. When this poll is triggered and the mobile device replies YES, the value will change to Poll151_response=YES. Further, all characteristics of messages sent and received by mobile device can be stored as attribute variables. Some non-examples of message characteristics include message content, time of sending, time of reception, and other suitable message characteristics.

Each attribute can maintain a list of message nodes that contain conditional expressions which use these attributes. In other words the attribute can have a link to the associated message nodes. If the attribute changes/initializes at any time of the protocol cycling, the dependent conditions in message nodes (children nodes) can be reevaluated. Further, the attribute variables can be added and/or removed during the cycling of the protocol.

Message nodes can be the core units of one embodiment, among others, of the present disclosure. They can include a message that should be communicated, and a conditional expression as a function of selected attributes that triggers the message when the condition is satisfied. Depending on a type of message, such as a broadcast, a poll, an on-demand, etc, it can also include a user interface for adding such a message. This can include a text window for typing or copying the message content, selecting a set of answers for polls, template messages that can facilitate the work, etc. The message node can maintain a list of attributes that are used in its conditional expressions.

The user (campaign operator) 109 can change the protocol flow at any time by revising conditional expressions. For automatic system configuration in this scenario, the message nodes can also include the list of attributes in their conditional expression. Any change in conditional expression, including adding or removing of an attribute, or removing the message, can update the list of conditions maintained by each attribute. This can facilitate system integrity when applying modifications. For example, the message nodes can be added and/or removed during execution of the protocol flow instance. Likewise, the list of attributes can be dynamically updated as well during the cycling of the protocol flow.

Additionally, the cycling of the system can be configured to avoid any conflicting logical flows in response to modifications. For example, if an attribute variable is changed, or a message node is removed, one of these changes can impact the triggering operation of other messaging nodes. The system will check the integrity of operation and provide guidance to the user if needed. In one embodiment, the system checks the integrity by executing a cycle simulation to validate that the changes do not cause any conflicting logical flows. If the simulation detects an error, the system can provide user interface prompts to identify the error and guide the operator as to a method for resolving the error.

A timer attribute structure can also be included in the system database 112. It can include the list of time stamps which can be used in conditional expressions. Some of them can be initialized from the beginning (static stamps), and some of them can be initialized dynamically depending on other events (e.g. 5 min after a change of an attribute). In addition, a timer attribute can be in absolute scale (common calendar) or relative scale (calendar, or days counted from a particular starting date/time). Once the timer reaches one of these time stamps, it can trigger some of the nodes if the conditional expressions include these time stamps. For example, the system can be programmed to trigger message#5 after 5 mins of triggering and sending message#4 if other conditions are also met. In this example, the triggering timing condition of message#5 will be "IF message#4_triggered_flag IS TRUE, then TRIGGER message#5 AT message#4_sent_time+5 mins." As with any other attributes, the timer attribute can maintain the list of messages which use them. In addition, the time attribute can force the system to cycle, depending on interactions with the mobile device. In other words, the various embodiments of the present disclosure involve a dynamic scheduling of events dependent upon a dynamic list of attribute variables.

As a non-limiting example, it is assumed that a triggered node may send a poll to a mobile device of the participant client device 106 expecting a response message. It can also send a broadcast message that is not assuming a reply. The system database 112 can receive specific messages from participant client devices 106 which are not initiated by the system through polls. All these entries from participant client devices 106 (through their mobile devices) and/or users (campaign operators) 109 that change/initialize attributes, can create reevaluation of triggering conditions, which in turn can trigger new messaging events in the system. In addition, the triggering conditions can include timing components. For example, a message can be triggered at certain time or it can be triggered at certain time only if other conditions are also met. A message scheduling may not directly involve the time as the condition, but can indirectly involve the time as the condition when associated conditional expression is satisfied at a certain time.

One advantage of the various embodiments relates to designing a protocol tree by maintaining the lists which connect attributes and message nodes. The user (campaign) client device 109 can focus on defining the participant attributes and configuring each message individually without a concern for designing or maintaining the whole tree as a whole, as the system will do it automatically in the background. For each message the user client device 109 will find and include designated attributes in the associated conditional expression. Each such designation can prompt the system database 112 to add this message node ID to the list of messages associated with the included attribute. The flexibility can be achieved by representing the tree as a package of all attributes for each user, and linking all message node IDs to these attributes. Thus, the lists of IDs can replace branches in conventional interpretation of protocols as trees. The instances of message transmissions when conditional expressions are satisfied, the instances of receiving participant replies to polls, the instances of receiving other designated messages from participants, the content of received messages, and instances of the campaign operators adding or changing system attributes can serve as system cycling impulses.

Thus all events occurring in the various embodiments of the present disclosure and the content associated with these events (message # left, message # received, message contains YES, etc) can prompt the system database 112 to react and update its attributes. Attribute changes can prompt reevaluation of conditional expressions in associated message nodes (known from the maintained lists). Some of these expressions can be satisfied and, in turn, trigger new messages for transmission. Some of these transmitted messages can prompt the participant client devices 106 to reply, and the protocol will cycle.

In addition, the user client device 109 can change the protocol flow at any time by revising conditional expressions. For automatic system configuration in this scenario, the message nodes can also include the list of attributes that impact the node triggering (parent attributes), so any change can update the list of conditions maintained for each attribute. In some embodiments, there can also be advanced system options where the same message is triggered several times based on several conditional expressions, such as in the scenarios where the message is triggered each time any of these expressions will be satisfied. In another modification, the same conditional expression may serve two or more messages. For example, if a conditional expression is satisfied, send the first message instantly, send the second message with a 5 minute delay, and send additional messages at other time increments.

Figure 2:
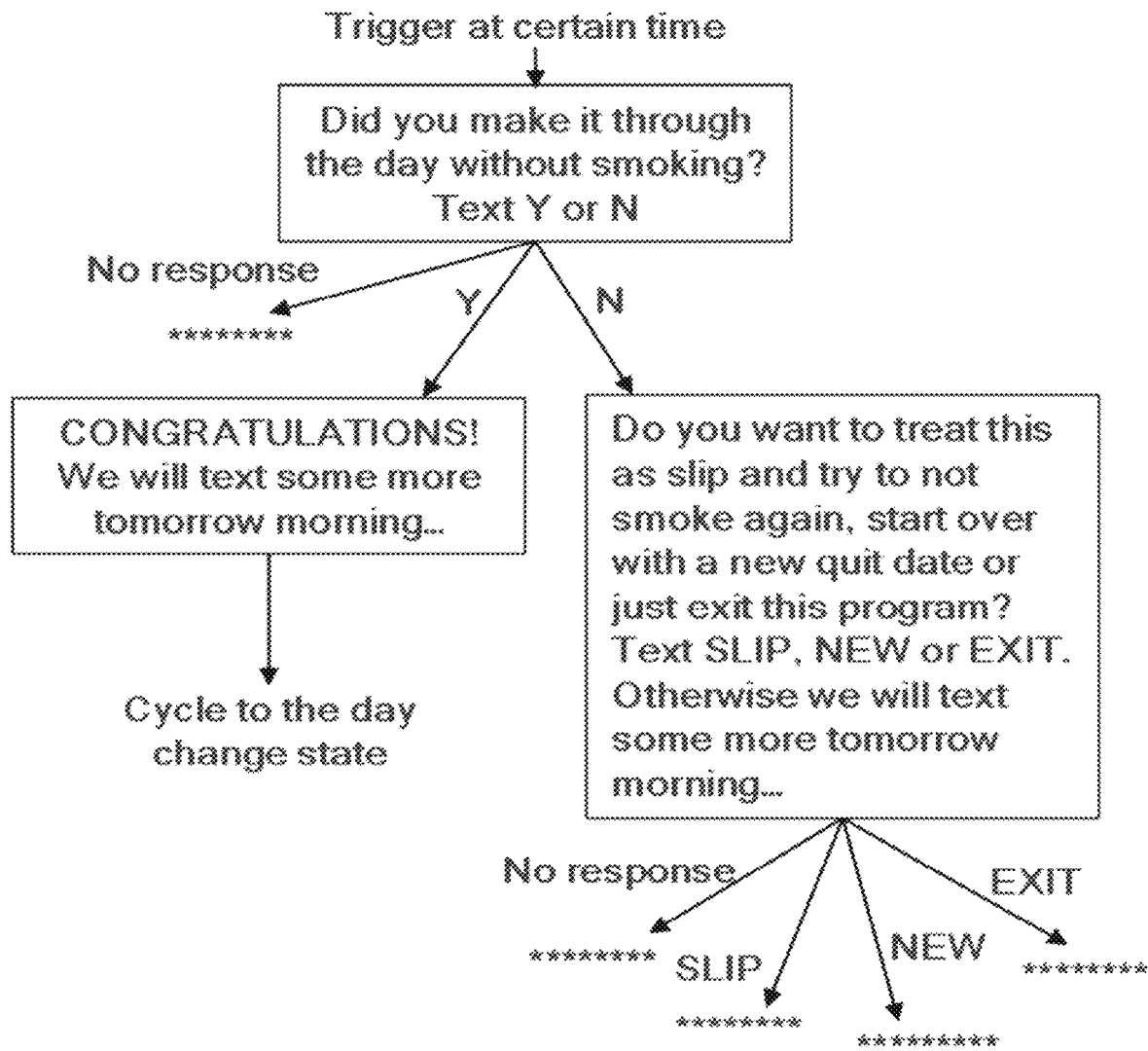
FIG. 2 is an example protocol fragment of a tailored automatic messaging protocol according to various embodiments of the present disclosure.
Figure 3:
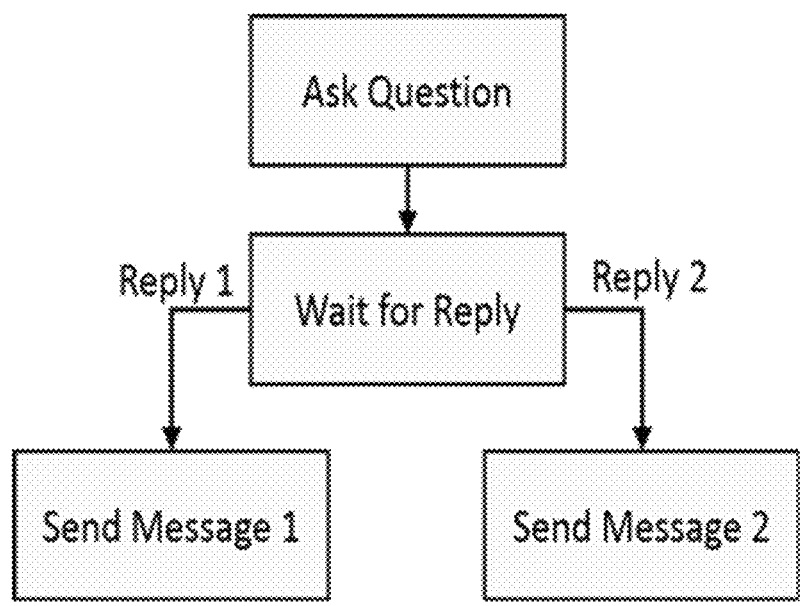
FIG. 3 is an example illustration of a state machine for an automatic messaging protocol according to various embodiments of the present disclosure.

With reference to FIG. 2, shown is a protocol fragment of a tailored automated protocol illustrating an example of an automated tobacco cessation protocol (hereinafter "Quitxt"). In one embodiment, Quitxt is a six-month protocol and includes several branches that can be executed every day for about one month. Quitxt can cycle three months with moderate branching, followed by lighter messaging intensity applied for the remaining months. The system can cycle based on participant responses. The system can send text messages to participants. Some messages are polls that are used for interactivity. FIG. 3 exemplifies such a system that sends one of two messages depending on participants' replies, which are modeled through the state-transitions. In a simplified view, these systems are typically developed using so-called state machine concepts. These implementations are not generic and rely on ad-hoc replication of specific protocol components. For this reason, their deployments are dedicated solutions that cannot be directly reused for other protocols.

Even if the state-machine nodes can be generic for implementing different protocols, the state-machine nodes that have a long duration and associated with large protocol trees are not user-friendly for non-technical campaign organizers to setup and adjust. The various embodiments of the present disclosure can add each autonomous message node independently to a communications protocol messaging flow. In addition, triggering and scheduling conditions can be set for each message associated with a particular autonomous message node. Thus, these embodiments use a message-centric concept, instead of a protocol-centric state-machine.

Further, FIG. 4 illustrates a communications protocol messaging flow 400 of multiple autonomous message nodes, which is enabled by distributed logical functions of triggering conditions applied to each autonomous message nodes. The communications protocol messaging flow 400 can include multiple message nodes 403a-403c (collectively "message nodes 403"), multiple participant attributes 406 stored in the system data base 112, and a networked data capture application 409. Each message node 403 can include a message 412k-412j (collectively "messages 412") and trigger conditions logic 415a-415c (collectively "trigger conditions logic 415"). The triggering conditions logic 415 can be realized using a non-technical menu on a user interface of a network page. Any condition variable value that is generated by the system during protocol cycling can be available for the following triggering condition checks. The attribute values can be set from poll replies, registration questionnaires, project settings, external sources of information, and other suitable data sources. The variables can be structured in data formats for optimal handling of internal logistics. The scheduler 121 can trigger messages when all the triggering conditions are met including timing conditions. The system can also be configured to be in data communication with the networked data capture application 409. For example, the networked data capture application 409 can build and manage online surveys and databases. The networked data capture application 409 can be used to support data capture for research studies. One example of the networked data capture application is REDCap®, a popular data collection environment. The networked data capture application 409 can provide data that triggers the triggering conditions logic 415 of a particular message node 403.

One benefit of the embodiments of the present disclosure includes encouraging researchers and communications professionals to initiate more mobile research/surveys studies. For example, in healthcare, one embodiment, among others, can encourage health promotion professionals to initiate more mobile Health studies due to ease of deployment, broader outreach, and convenient access to data. Polls can be used to interact with participants. The embodiments can also use natural language processing using state-of-the-art artificial intelligence methods and other extensions such as speech-to-text, etc. The natural language processing can be used for initiating message conversations, transmitting messages, responding to reply messages, responding to questions, and other forms of interaction with a user of client device. Thus, the various embodiments of the present disclosure provide customizable advanced automated interactive messaging services and useful interfaces with other data management systems to inspire broader use of technology-based interventions.

Components

Embodiments of the present disclosure facilitate broader usage of interactive promotions via mobile technology by providing a convenient service for non-technical campaign professionals. For example, one embodiment, among others, may facilitate the development of specific mobile health promotion projects and collaborate with a broader community of health researchers.

In one embodiment, among others, a first element of the interactive message system allows for non-technical protocol programming, such as intervention projects as a non-limiting example. The various embodiments can involve using a distributed state-machine concept with autonomously programmed message nodes and personalized user scheduling stored in a database. The first element can also include a connection to communication services, such as Short Message Service (SMS), instant messaging, automated chatbot services, email service, and related and extended communication protocols that can deliver messages. For example, the instant messaging service can include communications over Facebook Messenger®, and other similar services. In one embodiment, the system can be configured to operate in a hybrid mode. In the hybrid mode, the operator can send and receive messages to/from a mobile device in an audio chat mode simultaneously while executing the automated protocol. For example, the system can support integration with a live chat service.

The various embodiments can be integrated with various other communications systems to extend their capability for automated messages services, or hybrid service, as previously discussed. In addition, the embodiments can be integrated with a Content Management Systems (CMS). The embodiments can also be integrated with various human lifestyle trackers for interactive services, such as activity and nutrition trackers. Further, the various embodiments can be integrated with a billing system to charge for use of the communication protocol. For example, the system can track an amount of usage of the communication protocol. This tracking can involve tracking the number of messages sent or received. The tracking can also involve tracking the number of cycling instances of the communication protocol. The tracked usage can be used to determine a usage fee that can be based on a service plan, a usage volume, and other suitable pricing methods.

In another embodiment, among others, the interactive message system can include the following components in the table below:

| | System Components and Features |
|---|---|
| 1 | Database to handle all configuration and generated variables |
| 2 | Database for messages that is structured to handle various types such as broadcasts, polls, on-demand messages, etc |
| 3 | Triggering condition logic |
| 4 | Smart timer for scheduling messages that are triggered according to the triggering algorithm. |
| 5 | Interfaces to various delivery channels and related protocols, including the protocols supporting SMS, instant messaging, and data communication using deployed apps and internet connections |
| 6 | Multi-threading capability |

Figure 5A:
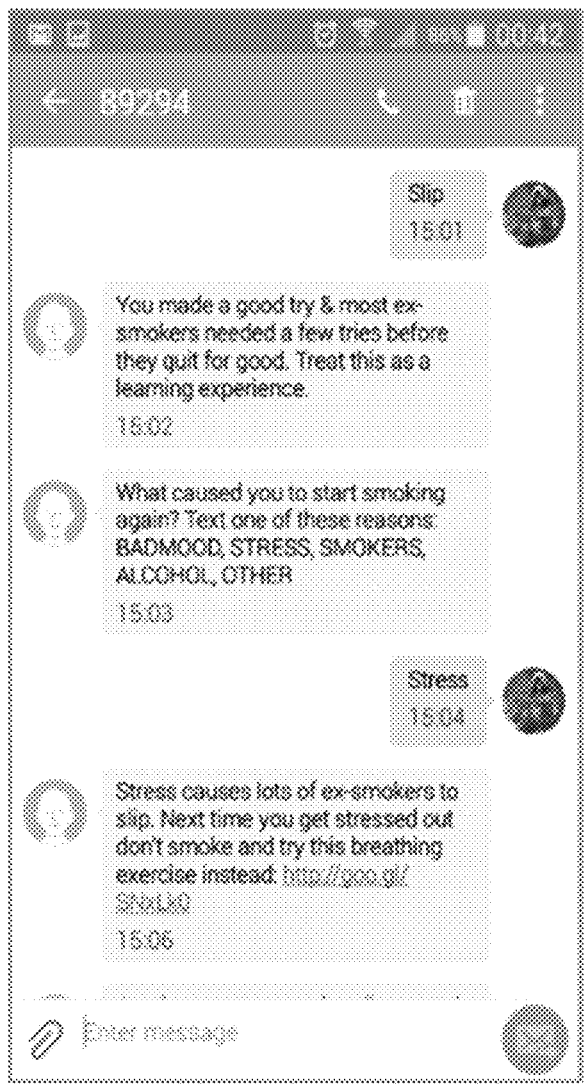
FIGS. 5A and 5B are example user interfaces of an automatic messaging protocol according to various embodiments of the present disclosure.
Figure 5B:
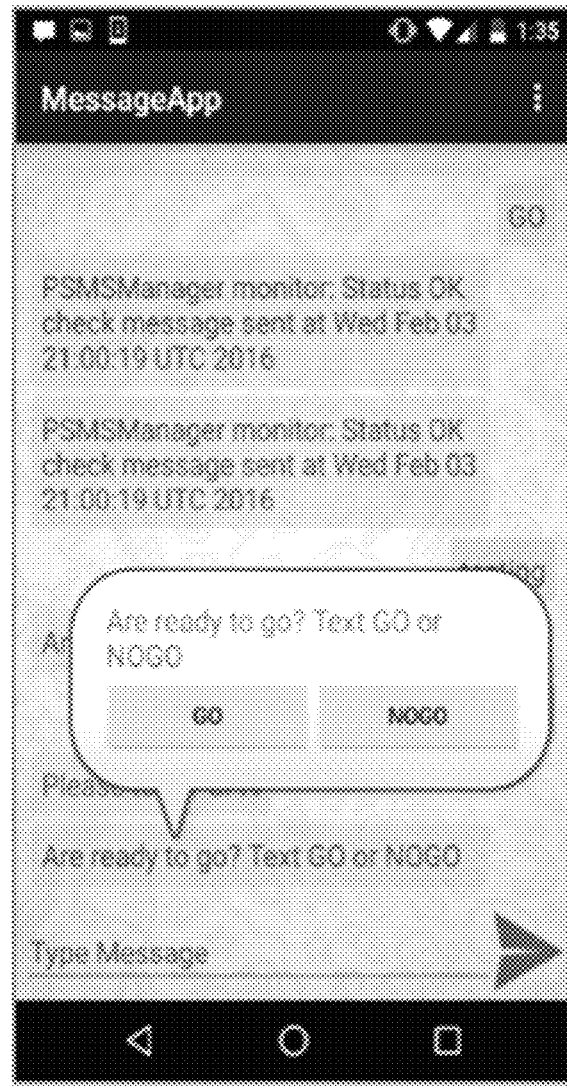
Figure 6:
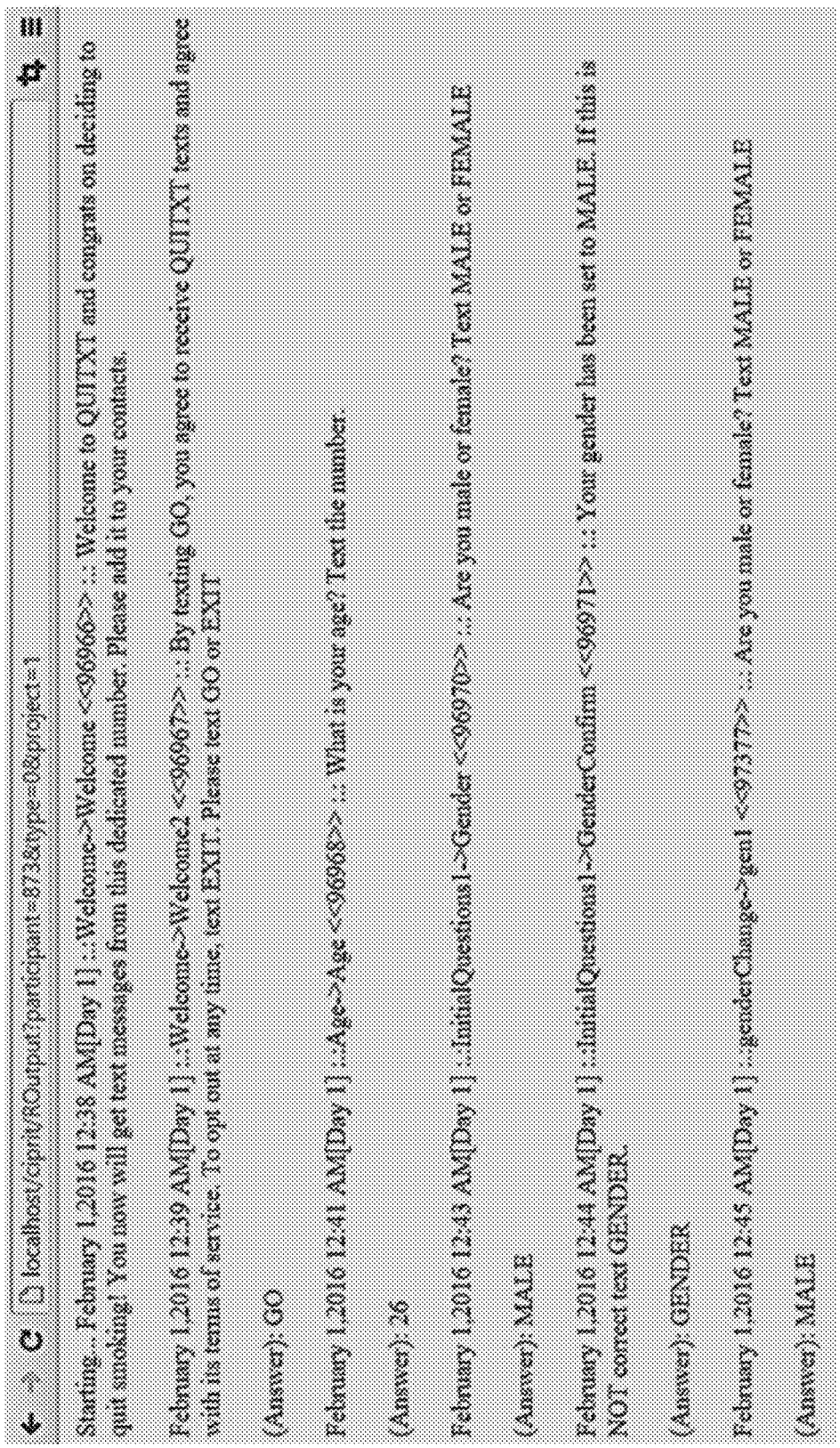
FIG. 6 is an example network page illustrating a test simulation of a deployed protocol according to various embodiments of the present disclosure.

A second element of the system can include generating user interfaces for the campaign operator client devices 109 and participant client devices 106. The system can support operators through a user-friendly non-technical campaign-protocol programming interface, and the system can provide a link to popular data collection systems, such as REDCap or other suitable data collection applications. In one embodiment, among others, the interactive message system can include the following components in the table below:

| | User interfaces |
|---|---|
| 7 | Website functionality for external access, and enable messaging channels. Similar to FIG. 5 |
| 8 | Access to internal/external variables and the logistics for defining messages and assigning triggering conditions. |
| 9 | Multilingual support |
| 10 | Interoperability with popular messaging apps, social networks and other systems that need integrated messaging support and interfaces |
| 11 | Mobile apps for facilitated interactivity of participants with the system. The apps work on various platforms such as Android, iOS, etc. FIG. 6 shows a screenshot of the proof-of-concept implementation that recognizes polls and opens a polling window for facilitated response in an SMS-channel based communication |
| 12 | Integrated voice-to-text and text-to-voice functionality. Integrated artificial intelligence tools to recognize natural languages, and advanced methods |

A third element of the interactive messages system can be a user friendly non-technical testing simulator that can allow campaign operators to test their automated systems before deployment. Most protocols cannot be tested in real-time and instead take several months for testing. The various embodiment of the present disclosure can include a simulator that accelerates time and can cycle the whole protocol in a shorter time period than existing solutions. In one embodiment, among others, the simulator can provide test case data, such as participant replies and other conditions, to accelerate testing of a communications protocol message flow. FIG. 6 is user interface screenshot of an example of a simulation test window for an automated protocol. Additionally, in some embodiments, the simulator can be used to validate the cycling of the protocol flow in response to modifications, such as changes to attribute variables, attribute lists, message nodes, and other changes. The simulator will check the integrity of operation and provide guidance to the user if needed. In one embodiments, the system checks the integrity by executing a cycle simulation to validate the changes do not cause any conflicting logical flows. If the simulation detects an error, the system can provide user interface prompts to identify the error and guide the operator as to a method for resolving the error

| | Accelerated testing |
|---|---|
| 13 | Protocol simulation capability for testing deployed protocols using accelerated-time simulation feature. FIG. 6 shows an example screenshot of the protocol testing window for a deployed Quitxt protocol implemented for UTHSCSA health researchers. |

Embodiments of the present disclosure can employ multithreading capability to increase processing and reduce system delays. Mobile application concepts vary, and examples are shown in FIGS. 5A and 5B. FIG. 5A is a screenshot of an example of a messaging thread of the QUITXT protocol implemented using a state-machine concept. FIG. 5B is a screenshot of an example of a messaging thread of a sample interactive mobile application for participant polling. In particular, FIG. 5B illustrates that various embodiments of the present disclosure can be integrated with other applications to enhance the experience of users.

Various embodiments of the present disclosure can be for various health promotion campaigns. In one embodiment, among others, the communications protocol messaging flow 400 can be directed to a SMS text message cessation service for young adult smokers. This non-limiting example can be implemented as a dedicated Quitxt service. In this embodiment, among others, text messages can include broadcast and poll messages, links to mobile-friendly web pages with additional content, and YouTube videos with peer modeling of reasons and skills to quit smoking. The communications protocol messaging flow 400 can facilitate transforming evidence-based SMS cessation assistance methods to fit the language use and cultural milieu of the targeted population, for example young Spanish and English speakers.

In another embodiment, among others, the communications protocol messaging flow 400 can be directed to facilitate obesity management programs that use family counseling, text messages, and newsletters to help obese/overweight minority children. These outreach efforts can assist with weight control, encouraging healthier eating, and promoting physical activity. The communications protocol messaging flow 400 can provide culturally tailored text messages for targeted communities and newsletters to reinforce changes suggested through counseling sessions with the participants.

In another embodiment, among others, the communications protocol messaging flow 400 can be directed to provide tailored message-based counseling service to sexual and gender minority populations who are more likely than other adults to be tobacco users and/or binge/heavy drinkers. These behaviors concurrently confer high risk of cancer and other chronic diseases. The embodiments of the present disclosure will facilitate the deployment of tailored message-based protocols for the unique needs of the targeted population.

In another embodiment, among others, the communications protocol messaging flow 400 can be directed to campaigns for improving the usage of treatment therapies for breast cancer patients such as Endocrine Hormonal Therapy (EHT). Evidence has shown that use of hormone therapy has contributed to improved breast cancer survival rates. Despite the proven benefits, about 33% of patients do not take their medication as prescribed and are at increased risk of disease recurrence and increased mortality. The communications protocol messaging flow 400 can be used as part of an initiative to provide a bilingual, culturally tailored, personalized, interactive mobile application (app) to promote and improve EHT adherence among breast cancer patients.

In addition, the various embodiments of the system and testing techniques can be linked to a dedicated mobile device application to enable various system features. For example, the system can include an associated client software for easy processing of polls. Messaging based on human typing can be prone to errors. Instead of free typing input to into an input field, the client software can be installed as a mobile device application, which will convert polls to user-friendly applications, such as button-based options (drop-down, radio, checklist, etc) for the replies.

Also, the system can enable for fast testing using accelerated time techniques. The time can be accelerated to cycle the system for significantly short time periods. For example, accelerating the cycle 24 times normal time will cycle one day of the protocol in one hour. This can allow for faster troubleshooting and testing of long time period protocols.

The system can also have a grouping logic that may assign different protocols to different groups. In other cases, the system can have functions that automatically create groups based on logical functions of participant attributes. The system can also include analytics on calculating statistics of participant behavior. The system can also include self-registration of participants.

Figure 7:
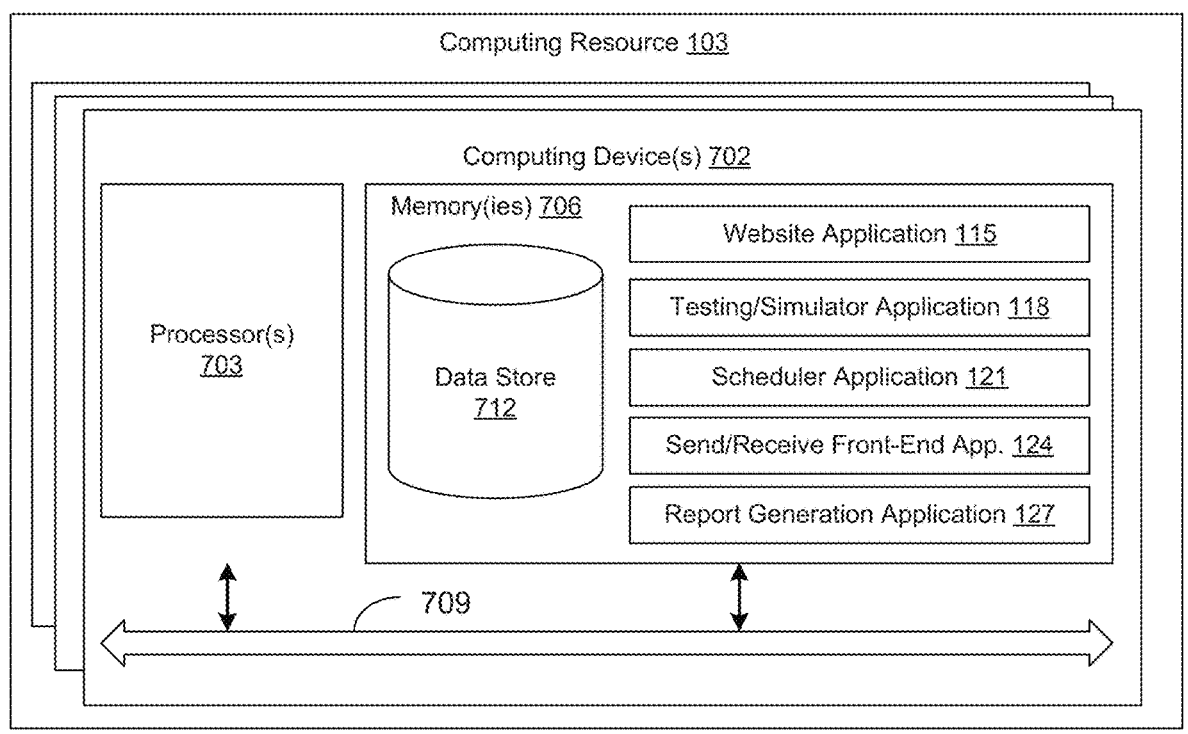
FIG. 7 is a schematic block diagram that illustrates an example computing environment employed in the networked environment of FIG. 1A according to various embodiments.

With reference to FIG. 7, shown is a schematic block diagram of the computing resource 103 according to an embodiment of the present disclosure. The computing resource 103 includes one or more computing devices 702. Each computing device 702 includes at least one processor circuit, for example, having a processor 703 and a memory 706, both of which are coupled to a local interface 709. To this end, each computing device 702 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the website application 115, the testing/simulator application 118, the scheduler application 121, send/receive front-end application 124 and/or report generation application 127, and potentially other applications. Also stored in the memory 706 may be a data store 712 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the website application 115, the testing/simulator application 118, the scheduler application 121, send/receive front-end application 124 and/or report generation application 127, and/or other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, any logic or application described herein, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 702, or in multiple computing devices in the same computing resource 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A non-transitory computer-readable medium embodying a program executable in a computing device, wherein, when executed, the program causes the computing device to at least:

maintain, in memory, a list of a subset of a plurality of attribute variables assigned to a mobile device, wherein the list of the plurality of attribute variables and a value assigned to each of the plurality of attribute variables can be updated during an execution of a communications protocol flow for the mobile device;

receive user input data specifying a plurality of autonomous message nodes associated with the communications protocol flow for the mobile device, wherein the plurality of autonomous message nodes can be updated during the execution of the communications protocol flow;

store the plurality of autonomous message nodes in the memory, wherein each of the plurality of autonomous message nodes comprises a message, a triggering condition, and an attribute list of the plurality of attribute variables used by the triggering condition, wherein each of the plurality of attribute variables comprise a message node list of the plurality of autonomous message nodes that use a respective attribute variable;

execute the communications protocol flow for the mobile device, wherein executing the communications protocol flow comprises cycling the plurality of autonomous message nodes based at least in part on a timing attribute from the plurality of attribute variables;

update the plurality of attribute variables based at least in part on a plurality of input messages received from the mobile device and an interpretation of the input messages according to the communications protocol flow;

validate the communications protocol flow to prevent a conflicting logical flow in response to an update during the execution of the communication protocol flow, the update comprising modifying at least one of the plurality of attribute variables or the plurality of autonomous message nodes;

determine a next autonomous message node among the plurality of autonomous message nodes in a message sequence based at least in part on the triggering condition being satisfied from receiving survey data from a networked data collection system and based at least in part on the attribute variables on the attribute list being assigned to a particular set of values, wherein the networked data collection system generates the survey data based at least in part on interacting with a plurality of participants over a network; and transmit, over a network, a message of the next autonomous message node of the plurality of autonomous message nodes to the mobile device.

2. The non-transitory computer-readable medium of claim 1, wherein the communications protocol flow comprises a first communications protocol flow, and wherein the program further causes the computing device to:

assign the first communications protocol flow for a first plurality of client devices that are assigned to a first group, the first plurality of client devices comprises the mobile device; and assign a second communications protocol flow for a second plurality of client devices that are assigned to a second group.

3. The non-transitory computer-readable medium of claim 1, wherein the program further causes the computing device to execute a simulation for the communications protocol flow by using an accelerated time cycle, wherein the accelerated time cycle comprises cycling a period of messaging activity in a shorter time.

4. The non-transitory computer-readable medium of claim 1, wherein the program further causes the computing device to execute a simulation for the communications protocol flow to validate a correct cycling of the communications protocol flow.

5. The non-transitory computer-readable medium of claim 1, wherein the program further causes the computing device to determine a usage fee for the communications protocol flow based at least in part on a volume of usage or a service plan.

6. A system, comprising
a computing device;
an application executable in the computing device, wherein the application, when executed, causes the computing device to at least:

store, in memory, a list of a subset of a plurality of attribute variables assigned to a mobile device;

store, in the memory, a plurality of message nodes for a communications protocol flow associated with the mobile device, each of the plurality of message nodes comprising a message, a trigger condition, and an attribute list of the plurality of attribute variables used by the trigger condition, wherein each of the plurality of attribute variables comprises a message node list of the plurality of message nodes that use a respective attribute variable;

execute the communication protocol flow for the mobile device, executing the communications protocol flow comprises cycling a sequence of the plurality of message nodes based at least in part on a timing attribute from the plurality of attribute variables;

validate the communications protocol flow to prevent a conflicting logical flow in response to an update during the execution of the communications protocol flow, the update comprising modifying at least one of the plurality of attribute variables or the plurality of message nodes; and send the message of one of the plurality of message nodes to the mobile device in response to a determination that at least one value assigned to at least one of the of plurality attribute variables associated with the message node satisfies the triggering condition of the one of the plurality of message nodes;

update a plurality of respective values assigned to the plurality of attribute variables based at least in part on receiving a respective message from the mobile device;

determine a next message node among the plurality of message nodes in the sequence based at least in part on the triggering condition being satisfied from receiving survey data from a networked data collection system and based at least in part on the attribute variables on the attribute list are assigned to a particular set of values; and transmit, over a network, a next message of the next message node of the plurality of message nodes to the mobile device.

7. The system of claim 6, wherein the networked data collection system comprises databases associated with a plurality of research studies.

8. The system of claim 6, wherein message conversation comprises the transmitted message and a plurality of received messages from the mobile device, wherein a plurality of message characteristics associated with the transmitted message and the received messages are stored as a message attribute sublist among the list of the plurality of attribute variables for the mobile device.

9. The system of claim 6, wherein the communications protocol flow comprises a first communications protocol flow, and wherein the application further causes the computing device to:

assign the first communications protocol flow to a first plurality of client devices in a first group, the first group being determined based on the first plurality of client devices having a first common attribute, the first plurality of client devices comprises the mobile device; and assign a second communications protocol flow to a second plurality of client devices in a second group, the second group being determined based on the second plurality of client devices having a second common attribute.

10. The system of claim 6, wherein sending the message comprises using at least one of Short Messaging Service (SMS), instant messaging service, an automated chatbot service, or an email service.

11. The system of claim 6, wherein sending the message further comprises using a hybrid communications mode, the hybrid communications mode comprising initiating at least one of an online chat, an audio, or a video communication channel with an operator simultaneously with the execution of the communications protocol flow of the plurality of message nodes.

12. The system of claim 6, wherein sending the message, interpreting the received respective message, or determining whether the trigger condition is satisfied further comprises using a natural language processing service or an artificial intelligence service.

13. A computer-implemented method for an automated message protocol, comprising:
- storing, in memory, a list of a subset of a plurality of attribute variables assigned to a client device;
- generating, via a computing device, a user interface configured to receive user input data specifying a plurality of message nodes associated with a messaging protocol flow for the client device;
- storing, in the memory, the plurality of message nodes, each of the plurality of message nodes comprising a message, a triggering condition, and an attribute list of the plurality of attribute variables used by the triggering condition, wherein each of the plurality of attribute variables comprises a message node list of the plurality of message nodes that use a respective attribute variable;
- executing, via the computing device, the messaging protocol flow for the client device by evaluating the trigger condition for the plurality of message nodes, wherein executing the message protocol flow comprises cycling the plurality of message nodes based at least in part on a timing attribute from the plurality of attribute variables;
- updating, via the computing device, the plurality of attribute variables based at least in part on a plurality of respective messages received from the client device and an interpretation of the respective messages according to the messaging protocol flow;
- validating, via the computing device, the messaging protocol flow to prevent a conflicting logical flow in response to an update during the execution of the messaging protocol flow, the update comprising modifying at least one of the plurality of attribute variables or the plurality of message nodes;
- determining, via the computing device, a next message node among the plurality of message nodes in a message sequence based at least in part on the triggering condition being satisfied from receiving survey data from a networked data collection system and based at least in part on the attribute variables on the attribute list are assigned to a particular set of values; and
- transmitting, via the computing device, the message of the next message node of the plurality of message nodes to the client device.

14. The computer-implemented method of claim 13, wherein the execution the messaging protocol flow is integrated with a Customer Relationship Management (CRM) system.

15. The computer-implemented method of claim 13, wherein the execution the messaging protocol flow is integrated with at least one of an activity tracker service, a nutrition tracker service, or a lifestyle tracker service.

16. The computer-implemented method of claim 13, further comprising updating one of the plurality of attribute variables in response to receiving a reply message.

17. The computer-implemented method of claim 16, further comprising determining whether one of the plurality of message nodes on the message node list is triggered in response to updating the plurality of attributes by determining whether all of the values of the attribute variables associated with the triggering condition are satisfied, wherein updating the plurality attribute variables comprises updating the values.

18. The computer-implemented method of claim 13, wherein the timing attribute can be represented in at least one of an absolute scale or a relative scale.

19. The computer-implemented method of claim 13, further comprising executing, via the computing device, a web-service that is configured to control an operation of the messaging protocol flow.

20. The computer-implemented method of claim 13, wherein the next message node is determined independent of a client device reply to a previous message transmitted in the message sequence.

\* \* \* \* \*